United States Patent
Skocek et al.

(10) Patent No.: US 11,642,625 B2
(45) Date of Patent: May 9, 2023

(54) METHOD FOR SCRUBBING EXHAUST GAS FROM $CO_2$ AND/OR $SO_x$

(71) Applicant: HConnect 2 GmbH, Heidelberg (DE)

(72) Inventors: Jan Skocek, Leimen (DE); Maciej Zajac, Heidelberg (DE); Mohsen Ben Haha, Heidelberg (DE); Stefan Federhen, Hirschberg (DE)

(73) Assignee: HConnect 2 GmbH, Heidelberg (DE)

( * ) Notice: Subject to any disclaimer, the term of this patent is extended or adjusted under 35 U.S.C. 154(b) by 113 days.

(21) Appl. No.: 17/600,158

(22) PCT Filed: Jun. 4, 2020

(86) PCT No.: PCT/EP2020/065402
§ 371 (c)(1),
(2) Date: Sep. 30, 2021

(87) PCT Pub. No.: WO2020/249444
PCT Pub. Date: Dec. 17, 2020

(65) Prior Publication Data
US 2022/0152554 A1    May 19, 2022

(30) Foreign Application Priority Data
Jun. 12, 2019   (EP) .................................. 19179579

(51) Int. Cl.
*C04B 18/08* (2006.01)
*C04B 18/14* (2006.01)
(Continued)

(52) U.S. Cl.
CPC ........... *B01D 53/62* (2013.01); *B01D 53/502* (2013.01); *B01D 53/508* (2013.01); *B01D 53/80* (2013.01);
(Continued)

(58) Field of Classification Search
CPC .... B01D 53/62; B01D 53/502; B01D 53/508; B01D 53/80; B01D 53/83;
(Continued)

(56) References Cited

U.S. PATENT DOCUMENTS

| | | |
|---|---|---|
| 7,906,086 B2 | 3/2011 | Comrie |
| 8,105,558 B2 | 1/2012 | Comrie |

(Continued)

FOREIGN PATENT DOCUMENTS

| | | | |
|---|---|---|---|
| EP | 0 610 781 A1 * | 8/1994 | ............. B01J 20/04 |
| EP | 2347815 A1 | 7/2011 | |

(Continued)

OTHER PUBLICATIONS

Engelsen et al.: "Carbon Dioxide Uptake in Demolished and Crushed Concrete" BYGGFORSK Norwegian Building Research Institute, Project report 395, Oslo, Dec. 1, 2005, pp. 1-38.

(Continued)

*Primary Examiner* — Timothy C Vanoy
(74) *Attorney, Agent, or Firm* — Collard & Roe, P.C.

(57) ABSTRACT

A method of exhaust gas scrubbing includes providing recycled concrete fines as a waste material rich in carbonatable Ca and/or Mg phases and with $d_{90} \leq 1000$ μm and a Rosin-Rammler slope n from 0.6 to 1.4, injecting the waste material into an exhaust gas stream containing $CO_2$ and/or $SO_x$ for reaction with $CO_2$ and/or $SO_x$ at a relative humidity of 50 to 100 Vol.-% and a temperature from 40 to 130° C. in an amount of dry waste material ranging from 5 to 30 kg/m³, withdrawing a partly carbonated and/or sulphurized waste material and purified exhaust gas, and recycling a part of the partly carbonated and sulphurized waste material while the remainder is discharged, as well as use of a waste material slurry for exhaust gas cleaning of $CO_2$ and/or $SO_x$.

23 Claims, 2 Drawing Sheets

(51) Int. Cl.
  *C04B 18/16* (2023.01)
  *B01J 20/04* (2006.01)
  *B01D 53/50* (2006.01)
  *B01D 53/62* (2006.01)
  *B01D 53/80* (2006.01)
  *B01D 53/83* (2006.01)
  *C04B 18/167* (2023.01)

(52) U.S. Cl.
  CPC ............ *B01D 53/83* (2013.01); *B01J 20/043* (2013.01); *C04B 18/08* (2013.01); *C04B 18/14* (2013.01); *C04B 18/167* (2013.01); *B01D 2251/402* (2013.01); *B01D 2251/404* (2013.01); *B01D 2251/602* (2013.01); *B01D 2257/302* (2013.01); *B01D 2257/504* (2013.01); *B01D 2258/0233* (2013.01)

(58) Field of Classification Search
  CPC ........ B01D 2251/402; B01D 2251/404; B01D 2251/602; B01D 2257/302; B01D 2257/504; B01D 2258/0233; B01J 20/043; C04B 18/08; C04B 18/14; C04B 18/167
  See application file for complete search history.

(56) References Cited

U.S. PATENT DOCUMENTS 8,367,025 B2   2/2013  Comrie
2008/0245274 A1* 10/2008  Ramme ................ B01D 53/62
                                                             106/672
2012/0291672 A1  11/2012  Gartner et al.

FOREIGN PATENT DOCUMENTS

EP       3498681 A1     6/2019
EP       3581257 A1    12/2019
FR     2 951 088 A1 *   4/2011  ........ B01J 20/28042
WO  WO 2004 098 740 A2 * 11/2004  ............ B01D 53/34
WO     2007/106372 A2    9/2007

OTHER PUBLICATIONS

B. Lagerblad: "Carbon Dioxide Uptake During Concrete Life Cycle: State of the Art" Tech. Rep. Swedish Cement and Concrete Research Institute, 2005, pp. 1-48.
International Search Report dated Jul. 16, 2020 issued in PCT/EP2020/065402.
International Preliminary Report on Patentability dated Nov. 6, 2020 issued in PCT/EP2020/065402.

* cited by examiner

METHOD FOR SCRUBBING EXHAUST GAS FROM $CO_2$ AND/OR $SO_x$

CROSS REFERENCE TO RELATED APPLICATIONS

This application is the National Stage of PCT/EP2020/065402 filed on Jun. 4, 2020, which claims priority under 35 U.S.C. § 119 of European Application No. 19179579.8 filed on Jun. 12, 2019, the disclosures of which are incorporated by reference. The international application under PCT article 21(2) was published in English.

BACKGROUND OF THE INVENTION

The present invention relates to a method for scrubbing exhaust gas by injecting a waste material in a dry or wet form into an exhaust gas stream and to the use of a waste material—stream for exhaust gas cleaning from $CO_2$ and/or $SO_x$, with x from 0 to 3.

Cement is an important construction material on the one hand, but on the other cement industry is straggling with the high $CO_2$ emissions related to the production of the cement clinker. The production of Portland cement, an essential constituent of concrete, leads to the release of significant amounts of carbon dioxide ($CO_2$), a greenhouse gas. It is said that the production of one ton of Portland cement clinker creates approximately one ton of $CO_2$. Approximately half of the $CO_2$ emissions from cement production stem from the calcination of limestone, i.e. the process where limestone is burnt and $CO_2$ gas is released to the atmosphere.

Further, emissions of sulphur oxides ($SO_x$) are also inherent in the cement manufacturing process. The presence of sulphur-based compounds in the raw materials has a great impact on the cement industry, owing to the large amount of limestone used in the process, especially when the deposits have a high content of pyrite ($FeS_2$). $SO_x$ is also generated from the burning of sulphur from the fuel used in the kiln or from waste typically burned in cement plants which can contain organic sulphur compounds. However, the allowed amounts of $SO_x$ emissions are limited. The inhalation of such substances entails risks to human health, and their interaction with the atmosphere results in the formation of sulfuric acid causing acid rain.

Since the basic chemistry cannot be changed, the industry tries to find other ways to reduce the $CO_2$ and $SO_x$ output. The easiest solution to limit this environmental $CO_2$ footprint is to produce composite cements. Unfortunately the increase of the proportion of the composite cements in the product portfolio is limited by the availability of high quality supplementary cementitious materials (SCMs), i.e. reactive materials resulting in appreciable strength development.

Carbon capture and storage (CCS) technologies have also been developed to mitigate the $CO_2$ emission from cement plants or coal fired power plants. However, these technologies did not reach technology development allowing for the full scale application. Additionally these technologies are cost intensive.

Natural carbonation of cement-based materials is a potential way to reduce the carbon footprint related to cement manufacturing process and use. Carbonation takes place during service life and after demolition when crushed concrete pieces are exposed to the atmosphere during a stockpiling period. Theoretically, due to the instability of hydration compounds in the presence of $CO_2$ (even in the case of the very low 0.04% $CO_2$ concentration which prevails in the atmosphere) concrete is able to absorb over time almost the same amount of $CO_2$ as that was initially chemically released during the calcite calcination in the cement kiln.

$CO_2$ reabsorption by carbonation is particularly relevant for recycled concrete aggregates (RCA) taken from demolition sites of concrete building and infrastructure. During concrete recycling, concrete is crushed and the smaller particle size accelerates the carbonation. After extraction of coarse recycled aggregates, the remaining fines are characterized by a quite high reacted cement content (an high amount of $CO_2$ can thus be absorbed). A similar approach can be used for other Ca- or Mg-rich waste material (e.g. fly ashes, slag etc.). Using natural carbonation to capture $CO_2$ in these materials, and particularly in recycled concrete fines (RCF), has already been proposed in recent studies, see e.g. Engelsen et al. "Carbon Dioxide Uptake in Demolished and Crushed Concrete", BYGGFORSK Norwegian Building Research Institute, Project report 395, Oslo 2005 and B. Lagerblad "Carbon Dioxide Uptake During Concrete Life Cycle: State of the Art", Tech. Rep. Swedish Cement and Concrete Research Institute, 2005. However, the carbonation of the stock pile concrete using air is a very long process, taking hundreds of years.

WO 2007/106372 A2 describes scrubbing of exhaust gas with a combination of a first component comprising sources of CaO and alkali metal ions and a second component comprising reactive silicates. Cement kiln dust, lime kiln dust and other CaO rich waste materials are preferred for the first component and slag for the second component. Preparation of a specific combination is laborious.

Therefore, reducing $CO_2$ emissions related to concrete production is a current challenge and is today a driver for innovations. At the same time the circular economy requires the reuse of the waste material streams. This includes the recycling and reuse of the used concrete. There are several examples of the application of RCA and RCF for the production of the concrete. The applicability of RCF in cement and concrete manufacturing is challenging due to inappropriate characteristics of the RCF such as high water demand and low to no latent hydraulic or pozzolanic reactivity. Similarly, the application of some high calcium fly ashes is challenging.

Not prior published European patent application No. 17207076.5 filed on Dec. 13, 2017, EP 3 498 681 A1, proposes carbonated RCF as supplementary cementitious materials. Carbonation is said to be achievable by exposing the RCF to exhaust gases. The document does not consider an effect of this carbonation on the exhaust gas.

Not prior published European patent application No. 18176964.7 filed on Jun. 11, 2018, EP 3 581 257 A1, proposes the use of a waste material, especially RCF, in a stockpile or a specific device for cleaning exhaust gas from $CO_2$ and/or $SO_x$, with x from 0 to 3. The disadvantage of this approach is that it is not easily integrated into existing scrubbing devices, reconstruction is needed.

Also, techniques for removal of $SO_x$ emissions from the cement industry have been suggested. These techniques fall into three broad categories: inherent removal by the process, process alterations, and $SO_x$ scrubbing technologies. Process alterations reduce the amount of $SO_x$ generated while scrubber technologies capture $SO_x$ after it has been generated. Some kiln systems can potentially reduce the amount of $SO_x$ generated through the use of process alterations, such as equipment changes, alterations to operating procedures, and/or raw material or fuel changes. However, equipment changes and operating alterations are cost intensive. Replacing one raw material with another raw material may not be economically feasible and increasing alkali input if for example $NaHCO_3$ for reducing the sulphur may not be possible because of product quality limits on total alkali concentration in the cement.

Scrubber technologies that capture $SO_x$ after it has been generated in the kiln system can be divided into four classes: dry reagent injection, hot meal injection, lime spray dryer absorber, and lime/limestone wet scrubbers. The overall sulphur capture efficiency is dependent on the type of absorbent injected, temperature of the injection zone, fineness of the absorbent, and residence time. An example of a dry reagent system is the addition of calcium hydroxide ($Ca(OH)_2$) to the kiln feed or its injection in the riser duct between the two upper cyclones of a preheater. A hot meal injection system uses calcined material from the kiln system as a source of lime (CaO) for the absorption of $SO_x$. A lime spray dryer system injects lime or a slurry of lime into the conditioning tower of the preheater.

The current state of art of scrubbing gas from acidous gas components, such as $SO_2$, is to bring these into contact with limestone in a wet process. The wet process with $CaCO_3$ releases in exchange for $SO_2$ the $CO_2$ into the atmosphere. The resulting product is $CaSO_4.2H_2O$. Such a process is generically applied in many industries, thereunder in the cement industry. The core of the process is to bring the wet slurry into intense contact with $SO_2$ and absorb the $SO_2$ in the aqueous slurry. As $CaCO_3$ is present in the slurry the dispersed, the acidous environment developed by the $SO_2$ will dissolve the $CO_2$ and by this finally forms $CaSO_4.2H_2O$:

$$CaCO_3 + SO_2 + \frac{1}{2} + 2H_2O \rightarrow CaSO_4 \times 2H_2O + CO_2(g)$$

$SO_x$ scrubbing can also be done with $CaCO_3$ or $Ca(OH)_2$ in a semi-wet or semi-dry absorption process. This process, which utilises decarbonated Ca-based absorbents, mainly produces $CaSO_3.\frac{1}{2}H_2O$ as a product. The core of this process is that $SO_2$ gets absorbed in a sprayed slurry and reacts within until the product is dry. However, the product is predominantly sulfite and not sulfate. As an absorbent this process requires $Ca(OH)_2$ dispersed in a slurry with up to 15% solids. The $Ca(OH)_2$ itself has normally been produced by thermally decarbonating $CaCO_3$:

$$CaCO_3 \rightarrow CaO + CO_2(g)$$

In order to make the CaO reactive it has to be hydrated in a second step:

$$CaO + H_2O \rightarrow Ca(OH)_2$$

Under the line both processes release $CO_2$ for the $SO_2$ absorption, either directly or indirectly. In the semi-dry or semi-wet process as an unwanted side effect, a portion of the $Ca(OH)_2$ re-combines to $CaCO_3$ again and thereby defeats the cause to absorb $SO_2$. Therefore semi-dry or semi-wet $SO_x$ absorption processes require usually a Ca to S stoichiometry of >1.3 mol Ca per mol S absorbed. In pure:

$$Ca(OH)_2 + SO_2 \rightarrow CaSO_3 \times \frac{1}{2}H_2O$$

Inherently though, the use of Ca-based absorbent made from limestone defeats the purpose of absorbing $CO_2$ in parallel to $SO_2$. Not even the semi-wet and semi-dry process absorb $CO_2$, because it was desorbed in the previous steps.

Therefore, currently no state of the art process exists which co-currently absorbs $SO_2$ and $CO_2$ without generating additional $CO_2$. There remains a need for development of a cost-effective process to reduce the $CO_2$ footprint and/or $SO_x$ emission of cement manufacturing. Furthermore, there is an ongoing need for cost saving, easy, and effective exhaust gas cleaning, especially in respect of carbon dioxide and sulphur oxides.

Surprisingly it has now been found that waste materials rich in carbonatable Ca and/or Mg phases and with high specific surface area, namely recycled concrete fines (RCF), which are able to absorb significant amounts of $CO_2$ and $SO_x$ from exhaust gases, can be used for scrubbing exhaust gas instead of the known substances limestone and calcium hydroxide. They are in particular useful for scrubbing exhaust gases emitted by cement plants and coal fired power plants or any other industrial process which has significant amounts of $SO_2$ and $CO_2$ in the off gas stream.

At the same time carbonation of the waste material RCF allows valorization of the RCF due to improved quality of the obtained carbonated material. This can be used as high quality SCM which enables high clinker replacement ratios and extension of the composite cement production.

SUMMARY OF THE INVENTION

Thus, the present invention solves the aforementioned problems by a method for scrubbing exhaust gas from $CO_2$ and $SO_x$, with x from 0 to 3, comprising a) providing recycled concrete fines with $d_{90} \leq 1000$ μm and a Rosin Rammler slope n from 0.6 to 1.4, b) injecting the recycled concrete fines into the exhaust gas stream for reaction with $CO_2$ and $SO_x$ providing in the exhaust gas stream an amount of dry waste material ranging from 5 to 30 kg/m³, a temperature ranging from 40 to 130° C. and a relative humidity from 50 to 100%, thereby at least partly carbonating and sulphating the recycled concrete fines, c) withdrawing carbonated and/or sulphurized recycled concrete fines and the purified exhaust gas, and d) recycling a part of the partly carbonated and sulphurized recycled concrete fines into step a) by combining it with fresh provided recycled concrete fines while the remainder is discharged. The object is furthermore achieved by a use of recycled concrete fines for exhaust gas cleaning comprising providing recycled concrete fines with $d_{90} \leq 1000$ μm and a Rosin Rammler slope n from 0.6 to 1.4, injecting the recycled concrete fines into the exhaust gas stream containing $CO_2$ and $SO_x$ for reaction with $CO_2$ and $SO_x$ providing in the exhaust gas stream an amount of dry recycled concrete fines ranging from 5 to 30 kg/m³, adjusting a relative humidity from 50 to 100%, and a temperature from 40 to 130° C., thereby at least partly carbonating and sulphating the recycled concrete fines, withdrawing partly carbonated and/or sulphurized recycled concrete fines and the purified exhaust gas, and recycling a part of the partly carbonated and sulphurized recycled concrete fines into the injection step while the remainder is discharged.

Thus, it has unexpectedly been found that carbonation and sulphurization of recycled concrete fines, also designated waste material in the following, affords an improved process for scrubbing exhaust gases containing $CO_2$ and/or $SO_x$. In particular the technology costs can be reduced, due to the simplicity of the method and direct use of existing scrubbing devices, which allows low investment costs. Furthermore, the present invention enables valorization of waste materials into added value products and provides an opportunity to secure new resources for composite cement production by valorization of RCF.

These and other features, aspects, and advantages of the present invention will become better understood upon consideration of the following detailed description, drawings, and appended claims.

In the context of this invention, carbonation means a chemical process where $CO_2$ reacts with Ca compounds, especially the cement hydration products from CaO, which are mainly calcium hydroxide CH (it is recalled that, according to cement chemist notation, C=CaO, H=$H_2O$, S=$SiO_2$, C̄=$CO_2$, A=$Al_2O_3$, F=$Fe_2O_3$, M=MgO, and $\bar{S}$=$SO_3$) and calcium silicate hydrates C—S—H. The analogous reaction with Mg compounds is included. Carbonatable means that carbonation occurs under ambient conditions.

The concept of the carbonation chemistry is well described elsewhere, e.g. in Engelsen et al cited before. During carbonation the carbon dioxide gas or carbonate ions have to pass through a carbonated surface into the material to reach fresh concrete. The speed of transport is mainly governed by concentration gradients, transport media (porosity) and thickness of the already carbonated concrete. Concrete carbonation is a very slow process since it is mainly governed by $CO_2$ diffusion through the porous network of the concrete. This explains that a full carbonation level can only be reached in a long-term perspective. The total amount of $CO_2$ uptake is increased after demolishing stage. $CO_2$ reabsorption by carbonation could be therefore particularly relevant for recycled concrete. During concrete recycling, concrete is crushed and the smaller particle size accelerates the carbonation. After extraction of coarse recycled aggregates, the remaining fines are characterized by a quite high reacted cement content (an high amount of $CO_2$ can thus be absorbed). Carbonation rate will be faster after demolition compared to the service life of concrete due to the increased surface area of finer particles when calculated by weight. Thus, the rate will increase with decreasing grain size fraction. The smaller the particle size, the faster the carbonation rate, even in the case of low water to cement ratio. Similar rules apply to sulphurization.

According to the invention waste materials rich in carbonatable Ca and/or Mg phases, recycled concrete fines, are used for cleaning the exhaust gas. Rich in carbonatable Ca and/or Mg phases means that at least 12.5 wt.-% of the waste material calculated as oxides is CaO and/or MgO and at least 80 wt.-% of the CaO and MgO is in carbonatable phases before carbonation. Preferably, CaO and/or MgO constitute at least 20 wt.-%, more preferably at least 30 wt.-% and most preferred at least 50 wt.-% of the waste material. Preferably, at least 85 wt.-%, more preferably at least 90 wt.-% of the CaO and MgO are in carbonatable phases. Thus, while a part of the carbonatable CaO and MgO in the waste material might be already carbonated before carbonation, at least 10 wt.-% of the material calculated as oxides is carbonatable but not yet carbonated CaO and/or MgO.

Gaseous $CO_2$ cannot, however, react directly with the Ca and Mg compounds like calcium silicate hydrates, magnesium silicate hydrates, and calcium magnesium silicate hydrates of the cement. Thus, the $CO_2$ gas must first dissolve in water and form carbonate ions that in turn will react with the Ca and/or Mg ions of the pore water. Due to the coupled diffusion mechanism, humidity is one of the controlling factors. In concrete with water filled connective pores the transport mechanism is ion diffusion leading to slow carbonation. In dry concrete the $CO_2$ gas diffusion is fast but the lack of water also leads to slow carbonation. Thus, if necessary, the relative humidity of the exhaust gas is adjusted to range from 50 to 100% according to the invention, either by the injected waste material slurry or by injecting water in addition to dry or semi-dry waste material. The same applies mutatis mutandis to the $SO_x$ which must also dissolve in water to react.

If necessary, the Ca/Mg-rich waste material can be subjected to a pretreatment stage according to the invention. For example, the recycled concrete fines can be subjected to a mechanical treatment, especially grinding, in order to improve fineness and thereby carbonation/sulphurization rate, i.e. ensure faster and more even carbonation/sulphatation. The particle size distribution determined by laser granulometry of RCF useful as the Ca/Mg-rich waste material according to the invention conforms to a $d_{90} \leq 1000$ μm, preferably to a $d_{90} \leq 500$ μm, more preferably to a $d_{90} \leq 200$ μm, most preferably to a $d_{90} \leq 100$ μm, with a Rosin-Rammler slope n from 0.6 to 1.4, preferably from 0.7 to 1.2.

The pretreatment can also include blending the waste material(s) with additional substances that accelerate the carbonation process and/or improve the final properties of the carbonated waste material, especially of a synthetic SCM when RCF are used as starting material. Preferably, substances for enhancing grinding or carbonating process or mixtures of two or more thereof are used as additional substances, Typically, additional substances will be included in an amount from 0.001 to 1 wt.-% with respect to the total waste material. Suitable substances include aqueous solvents like alkanolamines, for example primary amines like monoethanolamine (MEA) and diglycolamine (DGA), secondary amines like diethanolamine (DEA) and diisopropanolamine (DIPA), and tertiary amines like methyldiethanolamine (MDEA) and triethanolamine (TEA), or mixtures thereof, halogenides, ethylenedinitrilotetraacetic acid (EDTA) or other substances that improve dissolution of $CO_2$ in the pore solution. Additionally enzymes such as carbonic anhydrase can be used to enhance carbonation efficiency and modify the properties of the reaction products.

The waste material, optionally after pretreatment and/or adjustment of RH and/or admixing additional substances, is subjected to carbonation and/or sulphurization for cleaning the exhaust gas from $CO_2$ and/or $SO_x$ according to the invention by injecting the waste material into the exhaust gas.

The carbonation and/or sulphurization process rate increases with decreasing temperature. The free heat of the exhaust gases is utilized to increase the water dew point and accelerate the carbonation process by optimization of the RH. Ambient temperature is also suitable and is preferably used when heating would be needed otherwise. The most relevant condition to enhance the absorption of $CO_2$ or $SO_2$ is a low so-called approach temperature of <10° C. in the semi-wet or semi-dry arrangement, which is the differential of the water dew point and the operation temperature. This is facilitated when the water, e.g. of the slurry, evaporates. Thereby the gas temperature decreases and at the same time the water dew point increases. The final preferred gas temperature is 55° C. to 75° C. with a water dew point of 60 to 70° C. in a semi-wet scrubber after the main filter. Another possibility to enhance reaction rate and rate of exhaust gas cleaning would be the use of increased pressure. However, usually the gain in rate is not able to outweigh the expenditure needed to allow increased pressure, so typically the scrubbing takes place at ambient pressure. If increased pressure is possible, 0.01 to 4 bar overpressure, preferably 0.1 to 2 bar overpressure are useful.

In one embodiment a so-called semi-dry scrubber is used, wherein the waste material is injected in dry form. When insufficient water vapour is present, i.e. there is not enough steam in the exhaust gas, the relative humidity is adjusted to a range from 50 to 95%, preferably from 50 to 90% or 50 to 85%. For this, addition of dry waste material is combined with an addition of water or an addition of a part of the waste material in slurry form. Typically, water is injected at the beginning whereas during continuous operation the recycled part of the waste material contains enough water and the necessary water content is provided by injecting this slurry. The total amount of dry waste material in the scrubber ranges from 5 to 30 kg/m³, preferably from 10 to 20 kg/m³. This amount is supplied by the freshly fed waste material combined with the recirculated waste material. Water or a part of the waste material as slurry is injected to provide the required 50 to 90% RH and optionally cooling (gas conditioning). The added water or the slurry contains the admixed additional substances, if any. A typical amount of waste material in the slurry would be 4 to 28 wt-% suspended RCF solids, preferably 10 to 18 wt.-%. The proportion of dry RCF in the slurry and the amount of slurry RCF injected into the gas stream are dependent on the gas conditions and those to be achieved. Generally, a majority of the waste material will be injected as dry solid. The temperature is adjusted to range from 40 to 130° C., more preferably from 55 to 80° C. and most preferably to 55 to 75° C.

In another embodiment the wet process is applied in a so-called wet scrubber with a relative humidity of 100%. The waste material slurry has a solid waste material content from 4 to 28 wt-%, preferably from 10 to 18 wt.-%. The slurry is injected into the gas stream, wherein the liquid to gas ratio should be in the range of 20 to 50 liter of slurry per m³ of gas to enhance the absorption effect. The total amount of dry waste material, combined from fresh and recirculated material in the slurry, ranges from 2 to 15 kg per m³ of gas. Excess liquor is collected in a scrubber sump and reinjected via one or more slurry pump(s) and nozzle(s) into the gas stream again. The density of the recycled adsorption liquor ranges preferably from 15 to 25 wt-% solids. As this is a continuous process, a portion of the slurry is extracted and dried, and replaced by fresh slurry. Within the extracted amount, a portion of the waste material will remain unreacted. Usually, most of the slurry is recirculated into the scrubber, to minimize the unreacted amount. For example, in a typically sized plant from 1-2 m³ per hour are extracted and replaced with the same amount of fresh slurry while several thousand m³, e.g. from 2000 to 6000 m³, are recirculated. The temperature in the scrubber will establish itself in a range from 50 to 75° C. due to the equilibrium at the wet bulb temperature and the scrubber is operating at water saturated gas conditions. The temperature can be higher in case the scrubber is operated under pressure.

In a third variant a so-called semi-wet scrubber is used. Here the humidity is below 100% like in the semi-dry system, but the waste material is injected as a premixed slurry and not in dry form. The adjusted temperature and RH are the same as in the semi-dry scrubber.

The wet scrubber is normally positioned after the system filter, a semi-dry or semi-wet scrubber can be arranged before or after the system filter. When a gas conditioning tower located before the system filter is present it is also possible to replace the limestone or calcium hydroxide used there by the waste material. Thereby, absorption of $CO_2$ and/or $SO_x$ without associated carbon dioxide emission can be increased. Usual exhaust gas temperatures to a wet scrubber and a semi-wet or semi-dry scrubber downstream the main filter range from 80 to 250° C. The typical gas temperature entering the gas conditioning tower, also if utilized as a semi-dry or semi-wet scrubber up-stream the main filter or mill, ranges from 250° C. to 450° C. Inside the scrubber the temperatures are adjusted or establish themselves as explained.

Typically, in a semi-wet or semi-dry arrangement in the gas cleaning scrubber reactor a particulate collection device is used in the recirculation loop. There, the partially carbonated and/or sulphurized waste material is dried, preferably to a solid moisture level of <1%. The then dry recycle material is collected, preferably in a fabric filter, and re-injected in dry form into the exhaust gas stream. Thus, it is possible to let the waste material react to near chemical exhaustion with the $CO_2$ and $SO_2$ and to form a carbonated and/or sulphurized solid product. As this is a continuous process, the waste material and recycle material surface and pores will not be fully saturated and a portion of the material will always remain unreacted. The density of waste material (and recycle material) in the reactor is measured as a mass concentration and will usually be in a range from 5 to 30 kg/m³ (STP) of gas. In the wet process the partially carbonated and/or sulphurized waste material exiting the scrubber reactor is usually recirculated without drying. To extract a part of it a splitter is used, e.g. an overflow tank or a flap. The extracted part can be dried or further processed in slurry form. Most often it will be separated from water e.g. with a centrifuge, to reuse the water in the process.

The exhaust gas cleaned according to the invention can be any exhaust gas from a plant burning fuel like coal, oil, gas etc. and particularly fuels containing sulphur, to generate heat for a material or energy production process. In particular the raw exhaust gases from cement and power plants (coal fired power plants and others burning carbon based fuels) are cleaned, since the $CO_2$ and/or $SO_x$ concentration in them is high. But also exhaust gas from lime kilns, the magnesia industry, or sulphur containing exhaust gas from ceramics manufacturing, e.g. roasting pyrite or sulfite, can be cleaned. A typical exhaust gas from a rotary kiln for clinker manufacturing comprises: 14-33 Vol-% $CO_2$ depending on the clinkering technology, used fuels and raw materials, see e.g. "Carbon dioxide Capture and Storage: Special Report of the intergovernmental panel on climate change", P. Metz, Cambridge University Press, 2005, p. 79. It can further comprise from 0.002 to 0.2 Vol.-% $SO_x$ in the raw gas, depending mainly on the raw materials and fuel used but also on process settings. If carbonated RCF with low sulphur content is desired as by-product of the method, the exhaust gases can be cleaned from sulphur before scrubbing with the waste material according to the invention.

The treated exhaust gas can be further captured and processed as done currently. Such processing includes processes such as e.g. dust removal, gas cooling, gas conditioning or using the gas for other technological purposes such as heat recovery or drying of wet materials.

The invention will be illustrated further with reference to the attached figures, without restricting the scope to the specific embodiments described. The invention includes all combinations of described and especially of preferred features that do not exclude each other.

If not otherwise specified any amount in % or parts is by weight and in the case of doubt referring to the total weight of the composition/mixture concerned. A characterization as "approx.", "around" and similar expression in relation to a numerical value means that up to 10% higher and lower values are included, preferably up to 5% higher and lower values, and in any case at least up to 1% higher and lower values, the exact value being the most preferred value or limit.

DETAILED DESCRIPTION OF THE INVENTION

Figure 1:
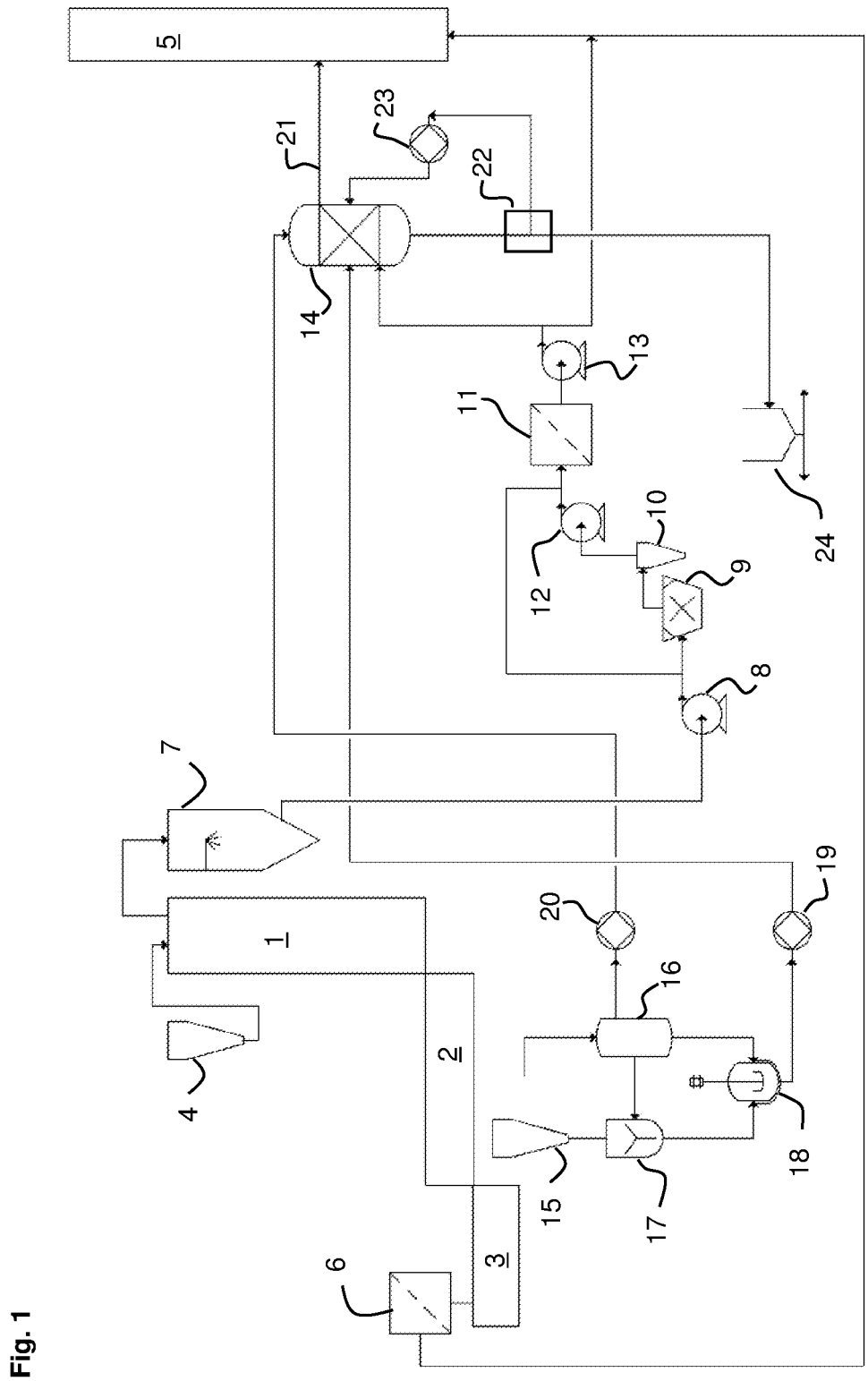
FIG. 1 schematically shows an embodiment of the method according to the invention using a slurry, i.e. a wet process, FIG. 2 schematically shows an embodiment of the semi-dry or semi-wet process.

In FIG. 1 a typical cement plant is shown. It comprises a preheater and calciner 1, rotary kiln 2 and clinker cooler 3 for manufacturing cement clinker from raw materials provided in a silo 4. Cooling air supplied to the cooler 3 is mostly passed into the kiln 2 and preheater/calciner 1, a part can be vented directly to the stack 5 via filter 6. The plant comprises a gas conditioning tower 7 for cooling the exhaust gas by injected water with or without limestone or calcium hydroxide addition. An induced draft fan 8 provides the necessary gas flow. As usual in the art, the conditioned exhaust gas from gas conditioning tower 7 is normally utilized to dry the raw material in mill 9, where also a part of the acid gases is absorbed onto the raw material. The range of $SO_2$ collection in the raw mill system varies between 10 and 95% depending on the gas, the raw material moisture and the raw mill type. Mill 9 is provided with a separator 10 to recycle coarser particles back to the mill 9 and pass the raw meal to silo 4. Exhaust gas from the mill 9 and separator 10 is passed to a filter 11 with the help of induced draft fans 12 and 13. In direct mode, i.e. when the mill 9 is not working, the exhaust gas from gas conditioning tower 7 is passed directly to the filter 11.

A wet scrubber reactor 14 is provided to clean the exhaust gas from $CO_2$ and/or $SO_x$ with injected waste material slurry. The slurry is provided from dry RCF in silo 15 and water from tank 16 in a mixing device 17 and stored in a hold tank 18. The mixing ratio of RCF to water usually ranges from 1:3 to 1:10, preferably from 1:4 to 1:6, most preferably it is about 1:5. A slurry pump 19 injects the slurry into the scrubber reactor 14. If needed, additional water can be injected with the help of water pump 20 to adjust the relative humidity to 100%. Exhaust gas (from filter 11) and waste material slurry are guided in counter current through the scrubber 14, cleaned exhaust gas leaving it at the top and being passed through line 21 to the stack 5. In the wet scrubber 14 the gas, which can enter at any temperature up to 250° C., is cooled by the injected RCF slurry and if needed by water, provided by the fresh water pump 20, to a wet bulb temperature of usually from 50 to 75° C., mostly from 55 to 65° C. as a function of the gas matrix exiting the kiln 2. The slurry has 10 to 28 wt.-% solids. The proportion of water injected via the pumps 19 and 20 is a function of the temperature reduction achieved by water quenching and the amount of slurry containing the RCF required to achieve the desired $SO_2$ collection efficiency. The slurry is fed at a rate of 20 to 50 l/m³. This ensures intensive contact with the gas constituents $SO_2$ and $CO_2$. Usually the $SO_2$ absorbing efficiency is 70% to 99% and dependent on the amount of unreacted RCF fed into the system. In the slurry usually a pH from 3 to 8, preferably from 4 to 6.5, and ideally of about 6 is adjusted. As the water is evaporated during the quenching of the gas with water make-up water is required and provided in the form of fresh slurry fed by pump 19 and by pump 20. The make-up water at the same time flushes the droplet separators in the exit of the wet scrubber 14 so that the particle carry over into the main gas stream is reduced to usually 5 to 20 mg/m³. The density of the slurry transferred by pump 23 and within the scrubber 14 is usually 10 to 18% solids, but not more than 28%. The total retention time of the RCF in the scrubber 14 is usually between 8 and 48 hours, but not less than 8 hours, to allow a full consumption of the active centers of the RCF of 95 to 99.9%, usually about 97%. The rate of $CO_2$ collection depends on the amount of RCF added. Once the gas has been cleaned and the droplet collected, it is released to the main stack 5. Optionally the stack gas can be reheated with clinker cooler off air so that the escaping gas does not develop water droplets once released to the atmosphere. The slurry with the partly reacted waste material leaves the scrubber 14 at the bottom and is divided in a splitter 22 into a first, usually major, part recirculated into the reactor 14 via pump 23 and a second, usually minor, part extracted into further processing device 24. The extracted part is mainly calcium sulfate and carbonate here. Other exhaust gas cleaning devices/measures can be foreseen, like catalytic or non-catalytic NO and $NO_2$. Further, it is foreseen that exhaust gas from filter 11 can also be vented directly to the stack 5.

The usual entry operation temperature of the scrubber 14 is 80 to 150° C. By this the operation temperature in a fully water saturated environment is 50 to 70° C. At this temperature, though the rate of RCF active center utilization is 10 to 30% and the $SO_2$ collection efficiency 20 to 90%, the $CO_2$ collection would be <5%. By recycling the RCF collected by the separator 22 back to the reactor 14, the utilization of the RCF in terms of $SO_2$ collection can be enhanced to a level in the range from 80% to 95%. The matured slurry has to be finally dewatered in either centrifuges, band filters or hydro clones. Usually, the residual moisture to be attained is 5 to 50%. But if dry residual RCF is needed, 5 to 25% can be provided, but mostly though a moisture of 10 to 15% can be expected whilst using a centrifuge or a vacuum band filter. The matured RCF can be reused for cement finish grinding or for concrete manufacturing.

Figure 2:
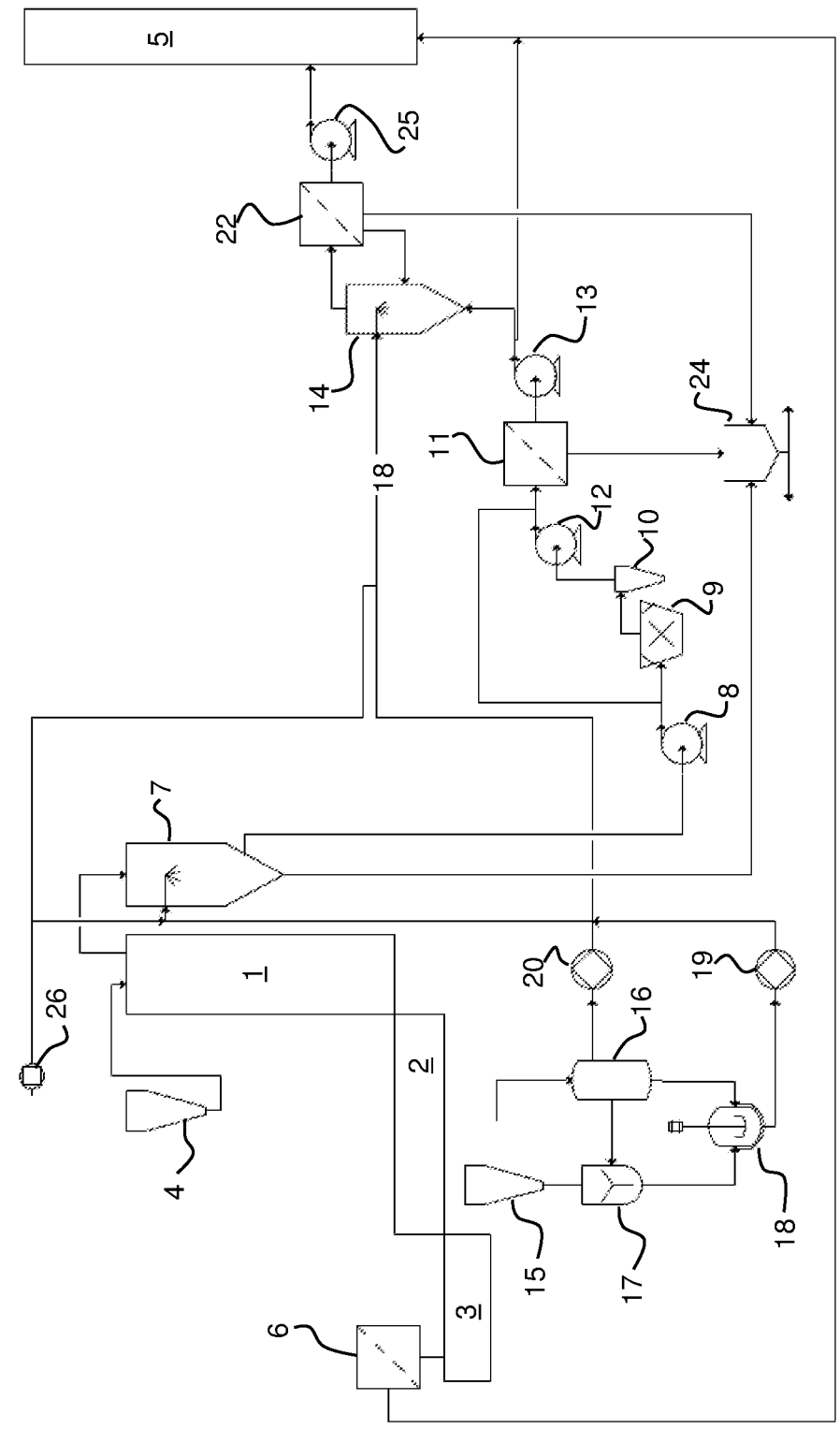

FIG. 2 illustrates a semi-wet process. Analogous parts of the plant are assigned the same reference numbers as in FIG. 1. Like in FIG. 1 the cement plant comprises the usual devices and the scrubber reactor 14 for cleaning exhaust gas is added after the dedusting filter 11. However, in contrast to FIG. 1 water is always additionally injected into scrubber 14 here. The humidity in the scrubber 14 is adjusted to below saturation and cleaned exhaust gas as well as partially carbonated/sulphurized waste material particles are passed out of the scrubber 14 at the top. The separator 22 extracts desired parts of cleaned gas and waste material and also recirculates the predetermined parts thereof to the scrubber 14. The product here is a mixture of calcium sulfite, sulfate, and carbonate. A fan 25 is installed to transfer the exhaust gas from separator 22 to the stack 5 and to assist extracting gas and particles from the scrubber 14. In the scrubber 14 the RCF slurry is dried by the inherent heat and by this the water dew point rises and the operation temperature is reduced at the same time to ideally 60 to 85° C. Once the gas is cleaned from $SO_2$ and $CO_2$ to a sufficient degree, it is conveyed via the fan 25 to the main stack 5 where it joins in with other gas or air streams such as the clinker cooler 3 off air. However, it does not have to be joined if it is not necessary to reheat the rather high moisture of gas streams. In the scrubber 14 the gas is cooled from usually 100° C. in compound mode down to 60 to 85° C. by means of injection of water via the water pump 20 and the RCF slurry via the slurry pump 19. In direct mode the temperature on the entry can be as high as 250° C. In order to have a good water spray atomization, the water droplets are furnished by a nozzle system, which works with compressed air from compressor 26 as an atomization agent. Usually 95% of the droplets produced have to be smaller than 800 μm. A finer droplet distribution will be of no negative impact to the reactor 14 but for the RCF utilization and collection of $SO_2$ and $CO_2$ in the filter 11 95% shall not be finer than 70 μm.

The slurry produced from the RCF from storage 15 and mixed in the slurry preparation tank 17 before passing into a hold tank 18 has a density of 10 to 28% solids. The proportion of water injected via the pump 20 is a function of temperature reduction requirements to achieve a low approach temperature differential between the final temperature in the reactor 12 and the water dew point. The approach temperature is usually 1 to 10° C., ideally 3 to 7° C., but a differential has to always remain to avoid water condensation on or in the related equipment as well as the equipment for dust/solid transports. In the scrubber reactor system 14, 22 and dependent of the amount of RCF slurry injected, the $SO_2$ collection efficiency can be as high as 95%, for example from a content of 1.500 mg/m³ down to 30 mg/m³. With the recycling of not fully carbonated/sulphurized RCF the reactor solid density can be controlled between 10 and 100 kg/m³. The loss of RCF out of the reactor, which has to be replenished with fresh slurry, is usually 1 to 10 kg/m³. Therefore, the recycle rate or passes back to the reactor is 10 to 1000 times, usually about 100 times. Once the dried RCF leaves the separator 22 they are favorably utilized up to 95% and can be used either for cement finish grinding or for concrete admixing. If service of the semi-wet scrubber 14 is necessary, the kiln exhaust gas can be bypassed directly to the filter 11 and stack 5. The rate of RCF utilization is typically 80 to 90%, but should not exceed 95% in order to avoid corrosion of the equipment.

List of Reference Numbers
1 preheater and calciner
2 rotary kiln
3 cooler
4 raw meal silo
5 stack
6 clinker cooler filter
7 gas conditioning tower
8 induced draft fan
9 raw material mill
10 mill separator
11 main system filter
12 mill induced draft fan
13 induced draft fan
14 scrubber reactor
15 waste material silo
16 water tank
17 slurry mixing device
18 waste material slurry hold
19 slurry pump
20 water pump
21 cleaned gas line to stack
22 separator
23 slurry recirculation pump
24 carbonated/sulphurized waste material processing
25 scrubber induced draft fan
26 compressor

What is claimed is:

1. A method for scrubbing an exhaust gas from $CO_2$ and $SO_x$ with x from 1 to 3, comprising the steps:
providing recycled concrete fines with $d_{90} \leq 1000$ μm and a Rosin-Rammler slope n from 0.6 to 1.4 in dry form or as a slurry,
injecting the recycled concrete fines into the exhaust gas for reaction with $CO_2$ and $SO_x$ to provide in the exhaust gas stream an amount of dry recycled concrete fines ranging from 5 to 30 kg/m³, and adjustung a relative humidity from 50 to 100% and a temperature from 40 to 130° C.,
withdrawing partly carbonated and/or sulphurized recycled concrete fines and cleaned exhaust gas
recycling a part of the partly carbonated and sulphurized recycled concrete fines while the remainder is discharged.

2. The method according to claim 1, wherein the recycled concrete fines are from recycling and reuse of used concrete.

3. The method according to claim 1, wherein the recycled concrete fines are added as a slurry containing from 4 to 28% by weight solids and in an amount from 20 to 50 l/m³.

4. The method according to claim 3, wherein the temperature during reaction of the recycled concrete fines with $CO_2$ and $SO_x$ in the exhaust gas is adjusted to from 55 to 75° C. for injection of the recycled concrete fines as a slurry at a relative humidity of 100%.

5. The method according to claim 1, wherein at least 12.5 wt.-% of the recycled concrete fines calculated as oxides is CaO and MgO and at least 80 wt.-% of the CaO and MgO are in carbonatable phases before carbonation.

6. The method according to claim 5, wherein at least 20 wt.-% of the recycled concrete fines calculated as oxides is CaO and MgO and at least 85 wt.-% of the CaO and MgO are in carbonatable phases.

7. The method according to claim 5, wherein at least 30 wt.-% of the recycled concrete fines calculated as oxides is CaO and MgO and at least 90 wt.-% of the CaO and MgO are in carbonatable phases.

8. The method according to claim 1, additionally comprising mechanical pretreatment of the recycled concrete fines.

9. The method according to claim 1, wherein the recycled concrete fines have a particle size distribution having a $d_{90} \leq 500$ μm and/or a Rosin-Rammler slope n from 0.7 to 1.2.

10. The method according to claim 9, wherein at least 20 wt.-% of the recycled concrete fines calculated as oxides is CaO and MgO and at least 85 wt.-% of the CaO and MgO are in carbonatable phases.

11. The method according to claim 10, wherein the recycled concrete fines are added as a slurry containing from 4 to 28% by weight solids and in an amount from 20 to 50 l/m³.

12. The method according to claim 11, wherein the temperature during reaction of the recycled concrete fines with $CO_2$ and $SO_x$ in the exhaust gas is adjusted to from 55 to 75° C. for injection of the recycled concrete fines as a slurry at a relative humidity of 100%.

13. The method according to claim 11, wherein the weight ratio between recycled and discharged recycled concrete fines ranges from 6000 to 200.

14. The method according to claim 10, wherein the temperature during reaction of the recycled concrete fines with $CO_2$ and $SO_x$ in the exhaust gas is adjusted to from 55 to 85° C. for injection of the recycled concrete fines as dry material with or without injection of water and/or slurry at a relative humidity from 50 to 95%.

15. The method according to claim 1, wherein the exhaust gas is taken from a plant burning fuel to generate heat for a material or energy production process.

16. The method according to claim 15, wherein the exhaust gas is taken from a coal fired power plant, a ceramics manufacturing plant, the magnesia industry, a lime kiln, or a cement plant.

17. The method according to claim 16, wherein before or after cleaning the exhaust gas is further subjected to one or more of:
dust removal,
gas cooling,
gas conditioning,
heat recovery,
and/or the cleaned exhaust gas is used for drying of wet materials.

18. The method according to claim 17, wherein the weight ratio between recycled and discharged recycled concrete fines ranges from 6000 to 200.

19. The method according to claim 1, wherein sulfur is removed from or diminished in the exhaust gas prior to scrubbing with the recycled concrete fines.

20. The method according to claim 1, wherein the temperature during reaction of the recycled concrete fines with $CO_2$ and $SO_x$ in the exhaust gas is adjusted to from 55 to 85° C. for injection of the recycled concrete fines as dry material with or without injection of water and/or slurry at a relative humidity from 50 to 95%.

21. The method according to claim 1, wherein the weight ratio between recycled and discharged recycled concrete fines ranges from 10000 to 100.

22. The method according to claim 21, wherein the weight ratio between recycled and discharged recycled concrete fines ranges from 6000 to 200.

23. The method according to claim 1, wherein before or after cleaning the exhaust gas is further subjected to one or more of:
dust removal,
gas cooling,
gas conditioning,
heat recovery,
and/or the cleaned exhaust gas is used for drying of wet materials.

* * * * *